United States Patent [19]

Muller

[11] Patent Number: 4,642,869
[45] Date of Patent: Feb. 17, 1987

[54] PROCESS OF ATTACHING A NUT TO A PLATE-SHAPED WORKPIECE

[75] Inventor: Rudolph R. M. Muller, Frankfurt, Fed. Rep. of Germany

[73] Assignee: Multifastener Corporation, Detroit, Mich.

[21] Appl. No.: 694,365

[22] Filed: Jan. 24, 1985

[30] Foreign Application Priority Data

Feb. 7, 1984 [DE] Fed. Rep. of Germany ....... 3404118

[51] Int. Cl.[4] ............................................. B23P 11/00
[52] U.S. Cl. .................................... 29/432.2; 219/99; 219/100; 219/104; 411/179; 411/283
[58] Field of Search .................... 29/432, 432.1, 432.2; 411/179, 436, 287, 265, 276, 287, 277, 281, 283, 284, 427; 219/99, 100, 104, 117

[56] References Cited

U.S. PATENT DOCUMENTS

| | | | |
|---|---|---|---|
| 1,083,217 | 12/1913 | McClellan | 411/283 |
| 2,520,259 | 8/1950 | Pummill | 411/265 |
| 2,623,974 | 12/1952 | Prucha | 219/98 X |
| 2,679,879 | 6/1954 | Engstrom | 411/284 |
| 2,709,469 | 5/1955 | Tripp et al. | 411/284 |
| 2,776,692 | 1/1957 | Granberry | 411/283 |
| 2,799,188 | 7/1957 | Newcomb | 29/432 X |
| 2,886,087 | 5/1959 | Pasenski | 411/265 |
| 2,909,205 | 10/1959 | Johnson | 411/283 X |
| 3,003,795 | 10/1961 | Lyon | 411/265 X |
| 3,208,494 | 9/1965 | Skidmore | 411/283 |
| 3,441,073 | 4/1969 | Johnson | 411/284 |
| 3,456,704 | 7/1969 | Johnson | 411/284 |
| 3,507,313 | 4/1970 | Stockslager | 411/284 |
| 3,734,156 | 5/1973 | Beard | 411/283 |
| 3,851,373 | 12/1974 | Shinjo | 411/179 X |
| 3,887,990 | 6/1975 | Wilson | 411/265 X |
| 4,189,978 | 2/1980 | Mauer | 219/99 X |

FOREIGN PATENT DOCUMENTS

| | | | |
|---|---|---|---|
| 922333 | 3/1963 | United Kingdom | 411/281 |
| 938490 | 10/1963 | United Kingdom | 411/179 |

*Primary Examiner*—Charlie T. Moon
*Attorney, Agent, or Firm*—Cullen, Sloman, Cantor, Grauer, Scott & Rutherford

[57] ABSTRACT

To attach a nut to a plate-shaped workpiece, especially to a metal sheet, in such a way that it has self-locking properties without additional aids or parts, the force fastening the nut and acting on a free thrust surface of the nut is divided into at least two effective components generating a shearing stress in the nut material, transverse deformation of a part of the nut facing away from the workpiece being produced, and the thread diameter in the thread region deformed for self-locking purposes being reduced, while at the same time the thread pitches are inclined towards the center axis. A nut which can be used either as a locking nut or as a non-locking nut is characterized by a force-deflecting design of the thrust surface.

5 Claims, 8 Drawing Figures

PROCESS OF ATTACHING A NUT TO A PLATE-SHAPED WORKPIECE

The invention relates to a process for attaching a nut to a plate-shaped workpiece, especially to a metal sheet. It also relates to the nut itself, in particular a nut to be fastened to a plate-shaped workpiece, with a fastening part and with a basic body which adjoins the latter in the direction of the nut axis and which, on the side of the nut facing away from the workpiece, forms, together with nut shoulders, a thrust surface. Finally, the invention relates to an appliance for attaching a nut designed according to the invention to a plate-shaped workpiece, especially to a metal sheet, with a pressure-loaded ram and a die arranged opposite it and underneath the metal sheet.

The nuts referred to in this connection include, in particular, rivet and stamping nuts, but also weld nuts. An example of both a rivet nut and a stamping nut is illustrated and described in German Patent Specification No. 1,253,521; this nut is also called a "UP" nut (Universal Pierce Nut). A further example of a stamping nut which can be used within the scope of the invention is the socalled "HS" nut (High Stress Pierce Nut). Finally, they also include the so-called "TM" nut (Thick Metal Nut) and the "BUP" nut which is an alternative form of the "UP" nut.

Releasable screw connections often have to absorb not only operating loads, but also forces arising from vibrations in one or more axes. As a result of fretting corrosion, these forces either exert a wedging effect on the connecting thread parts or, because of the vibration inertia forces, generate a loosening torque which results in loosening of the thread parts of the nut and/or of the screw.

The danger of loosening of the parts screwed into one another or with one another arises, in particular, in the case of moments of rotation occurring because of alternating connection loads and multi-axial vibration movements. This happens very often in thin-walled compartments connected by means of a screw and nut, since here alternating operating loads and vibrations develop into particularly unfavourable loosening torques. Threaded connections which become loose automatically and unintentionally present mainly an increased risk of damage and accident in addition to all the other harmful effects, since, for example in the case of stationary machines, such as washing machines, damage caused by leaks can occur because of the loosening of connecting elements.

So that automatic loosening of parts screwed to one another becomes more difficult or even impossible, non-positive locking means are known, and these, because of the reaction force of the connected parts which acts after the tightening of the connecting elements, prevent loosening caused by the moment of friction existing between the thread parts of the screw and the nut itself or between one of the thread parts and one of the connected parts (see German Offenlengungsschrift No. 3,011,957. Non-positive thread-locking means offer good protection, whilst at the same time maintaining uniform assembly conditions. However, a disadvantage is that in the state of delivery they are no longer true to gauge, and this has a restricting effect on the load-bearing capacity which is always checked, for example when goods are received.

Where known combined non-positive and positive locking means are concerned, parts assigned to the screw or to the nut or auxiliary materials can be worked, during connection, both into the materials to be connected and into the connecting elements themselves. This makes loosening more difficult under operating conditions involving superimposed vibrations (see German Auslegeschrift No. 2,638,937 and German Offenlegungsschrift No. 3,015,078). However, thread-locking means of this type have a reliable effect, for example the formed-on shaft disc according to German Offenlegungsschrift No. 3,015,078, only when the locking materials meet the requirements or are even actually present. Damaged materials or lost locking elements entail a danger which cannot be prevented. In addition, the locking elements are often damaged by the wrong assembly tool or as a result of excessively high tightening torques, with the result that, for example, teeth or the like which are provided are destroyed during overwinding. Such destroyed teeth or their impressions in the components to be connected produce notch effects which reduce to an extreme degree the fatigue strength of the connecting elements and/or of the connected parts. Also, where locking means of this type are concerned, it is possible only at a high outlay to establish whether they are true to gauge.

Properly attached positive thread-locking means offer substantially reliable protection against loosening. In this type of thread-locking means, after the connecting elements have been tightened, additional aids, for example split pins or a wire, are, in a subsequent operation, fastened to the screw or to the nut and secured either to one another or to the parts holding the screw connection together, for example castle nuts and nuts with locking plates or with wire-locking being suitable for this (see Dubbel, Machine-building Manual, 14th edition, 1981, pages 382 and 383). However, it is also true here that safety against loosening is restricted when the parts causing positive locking are attached incorrectly. Such mistakes often occur, particularly in connection with repair work, above all in cases where repairs have to be carried out outside the workshops or at assembly locations which are not fitted out in the appropriate way. All these elements have the basic disadvantage that they are not of universal use, that is to say they cannot be used for normal purposes not requiring a locked screw connection.

The object on which the invention is based is to propose a process of the type mentioned in the introduction, by means of which it is possible in a simple way to attach nuts which will possess self-locking properties without additional aids or parts. At the same time, it will be possible to employ nuts which can be used with either a locking or a non-locking function.

Starting from the idea of utilising the fastening step required to attach a nut, especially a weld, rivet or stamping but, to a metal sheet for carrying out thread deformation of the nut thread, in a process of the type mentioned in the introduction, this object is achieved when the force fastening the nut and acting on a free thrust surface of the nut is divided into at least two effective components generating a shearing stress in the nut material, transverse deformation of a part of the nut facing away from the workpiece being produced, and the thread diameter in the thread region deformed for self-locking purposes being reduced, whilst at the same time the thread pitches are inclined towards the centre axis.

These measures achieve the surprising result that the force required to fasten the nut can be utilised additionally for specific deformation in precisely predetermined nut regions, as a result of which the installed nut then acquires in the appropriate thread region a shape which ensures self-locking penetration of a screw, that is to say, when the screws are screwed in, a screwing torque, for example one sixth higher, has to be generated for the thread connection locked according to the invention than in the case of a non-locked thread connection.

Thus, as a result of the invention, not only are additional parts or aids saved, but also set-up times, necessary in the state of the art to prepare and assemble the connections, are also avoided.

Preferably, the forces exerted or transmitted to the nut by means of a ram, and, as already mentioned in the introduction, the process is particularly suitable for fastening nuts provided with shoulders forming at least one part of the thrust surface, especially weld, rivet or stamping nuts, the ram touching the shoulders only after the formation of the self-locking portion of the thread has ended. This ensures that the actual fastening of the nut starts only when the desired deformation of the self-locking portion has been completed, since only then is the force transmitted via the shoulders to the fastening part of the nut in such a way that stamping, riveting or welding is effected in the desired way. At the same time, the type of material of the nut is not without significance, so that in a further embodiment of the invention the start of deformation in relation to the final touching of the shoulders by the ram is selected as a function of the material of the nut, that is to say the travel of the ram from its first contact with the nut to its contact with the shoulders of the latter represents the critical deformation distance covered by the ram. Since the nut material on the one hand possesses certain spring properties, but on the other hand is also varyingly resistant, a different length is obtained for this said deformation travel of the ram where different types of material are concerned, and this length must be set by means of suitable shaping of the ram and of the nut regions facing it.

Consequently, the nuts to be fastened to a plate-shaped workpiece, especially to a metal sheet, preferably by the process according to the invention, have a fastening part and a basic body which adjoins the latter in the direction of the nut axis and which, on the side of the nut facing away from the workpiece, forms, together with nut shoulders, a thrust surface which according to the invention has a force-deflecting design. The nut according to the invention therefore receives a profile which, when the ram is of appropriate design, allows the latter to act on specific regions of the thread for the purpose of deformation, before the ram introduces via the thrust surface the forces necessary for fastening the nut. Thus, when the ram thrust surface is of plane design, a further considerable advantage of the invention can be provided, namely that the nuts can then be fastened without receiving self-locking properties. This represents a tremendous simplification in practice, because now only one type of nut is necessary, and this is suitable both for self-locking fastening and for non-locking fastening, thereby not only simplifying stock-keeping, but also increasing flexibility in specific uses. The force-deflecting design of the thrust surface can be obtained in a simple way by means of a raised extension of the shoulders with forming slopes.

The extension can preferably be arranged coaxially relative to the threaded bore and can have a trapezoidal cross-section with forming slopes merging into free shoulder surfaces. In the case of a rectangular nut, the trapezoidal extension extends tranversely over the entire width, and the forming slopes extend at an angle of approximately 10° to 30° relative to the vertical; this angle must be larger than the self-locking or friction angle. The nut cross-section obtained in this way not only makes it possible to feed the nut more easily, since the extension is suitable as a feed aid for positive locking by means of an available device, but also, in particular, presents forming surfaces, by means of which a force acting from outside can be allocated to influence at least the form of the uppermost thread pitches. A screw screwed into the deformed thread remains in a secured position without further accessory parts. On the other hand, as already mentioned, the nut cross-section also makes it possible to attach the nut to a metal sheet without thread deformation; in this case, the force required for fastening is introduced solely via the plane upper surface of the trapezoidal extension. The force then passes vertically into the nut body; there are consequently no lateral effective components of the force.

In an appliance for attaching a nut to a plate-shaped workpiece, especially to a metal sheet, with a pressure-loaded ram and a die arranged opposite the latter and underneath the metal sheet, according to the invention the ram possesses a contour negative relative to the nut, that is to say a trapezoidal ram recess which is cut out towards the inside and the oblique side walls of which are formed by forming slopes, the forming slopes preferably having additional forming humps. It is also possible for the recess to have a depth greater than the height of the extension. In any case, the contour or form of the extension and of the recess engaging over it must guarantee that, when the opposing matching surfaces come in contact with one another, the force has a deforming effect on the thread of the nut, for example by means of angles differing from the vertical of the forming slopes of the ram recess and the forming slopes of the extension.

A screw screwed into a nut connected to a metal sheet in this way acquires a self-locking fit in the partially deformed thread of the nut without further locking measures.

Such a nut, because of its special design, has on the side facing away from the sheet a form which, under the effect of the press ram or the material softening obtained during welding by means of the electrode or even the force to be exerted during riveting, experiences a dimensional change which acts as a thread-locking means. This dimensional change can be selected according to the type and manner of the possible fastening operation, without additional work being required. In all cases, a sufficient force acts on the side of the nut located opposite the bearing surface of the nut on the metal sheet material, that is to say on the top sides of the nut shoulder which are present on both sides of the trapezoidal projection. The pressure forces to be absorbed by the top side of the nut shoulder generate surface pressures which, where thick metal sheets are concerned, are at the permissible limiting values of the nut material.

The displacement of material caused by the allocated effective components when the force is exerted and occurring within the locking portion of the stamping nut results in a thread form, of which the flank diameter seen from the screw-in direction runs inwards in a form of a cone shell in the last two thread pitches. The dimensions obtained are less than the permissible minimum dimensions of the screw intended for the threaded connection. However, the thread pitches themselves have not been deformed as such; on the contrary, they acquire in a radial plane a wave form with a spring effect, that is to say, when the screw is screwed in, they come into line with the remaining thread, but then, when the screw is removed, return to the position inclined inwards.

The invention is explained in more detail below with reference to a preferred exemplary embodiment illustrated in the drawing. In the drawing.

Figure 1:
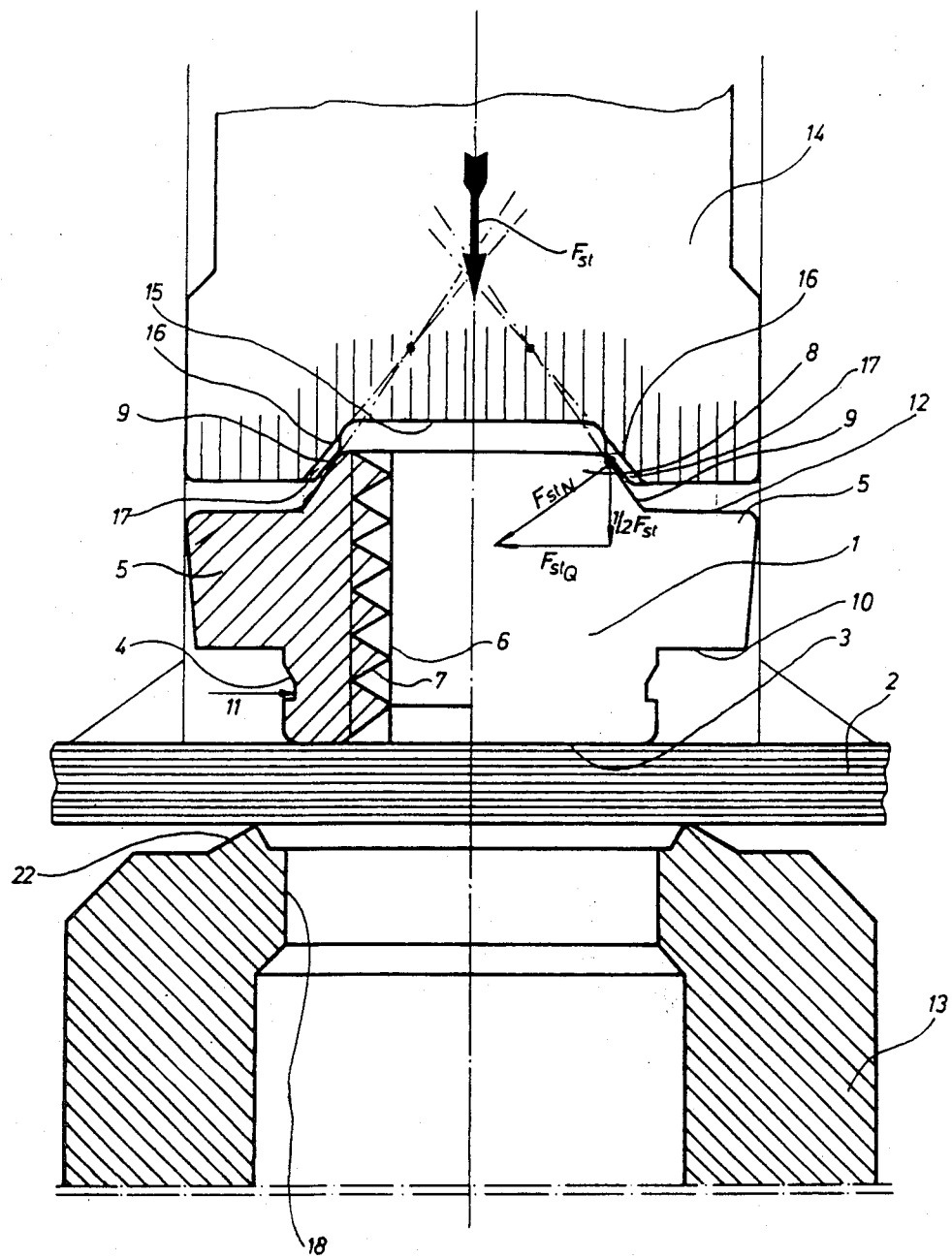
FIG. 1 shows, in cross-section, a stamping nut according to the invention before fastening, positioned in axial alignment with a die on a metal sheet.

The invention is first explained in more detail by the example of a stamping nut according to German Patent Specification No. 1,253,521. The nut designated by 1 possesses a lower plane bottom surface 3 resting against the metal sheet 2 to be connected, with an undercut fastening portion 4 which adjoins the said bottom surface 3 and has grooves 11 and which merges into nut shoulders 5 with bearing surfaces 10 extending perpendicularly to the nut axis. The polygonal, preferably rectangular nut 1 has a threaded bore 6 passing axially through the nut body and having a thread 7 and receives, on the side of the nut shoulders 5 which face away from the metal sheet 2, an extension 8 which is raised by the amount H and which is designed as a trapezoidal projection with forming slopes 9 merging on the top side of the nut shoulders 5 into free shoulder surfaces 12 of equal size. The extension 8 is arranged with its forming slopes 9 symmetrical to the threaded bore 6. The minimum dimension of the width at the top end of the extension is preferably calculated approximately from the thread outside diameter plus 1.5 times the thread pitch; for example, this dimension for a nut with a thread M6=6 mm plus 1.5 mm×1.0 mm=7.5 mm. The height H of the extension is preferably 1 to 1.2 times the thread pitch, for example, for M6 with a thread pitch of 1 mm, a maximum of 1.2 mm.

Before fastening, the nut 1 rests on the metal sheet and is positioned in axial alignment with a die 13. A nut ram 14 engages from above over the nut 1 by means of a recess 15 matching the trapezoidal extension 8 of the nut 1 and of appropriate depth T and with its forming slopes 16, and additional forming humps 17 attached to them, comes up against the opposing forming slopes 9 of the nut 1. The depth of the forming slopes 16 of the nut ram 14 is greater than the height of the forming slopes 9 of the extension 8. Consequently, at the bottom dead centre of the tool, the main pressing-in force acts via the free ends of the nut ram on the free ends or the free shoulder surfaces 12 of the nut 1. The air gap between the nut ram and the free end face of the extension 8 is present even when the tool passes through the bottom dead centre.

Figure 7:
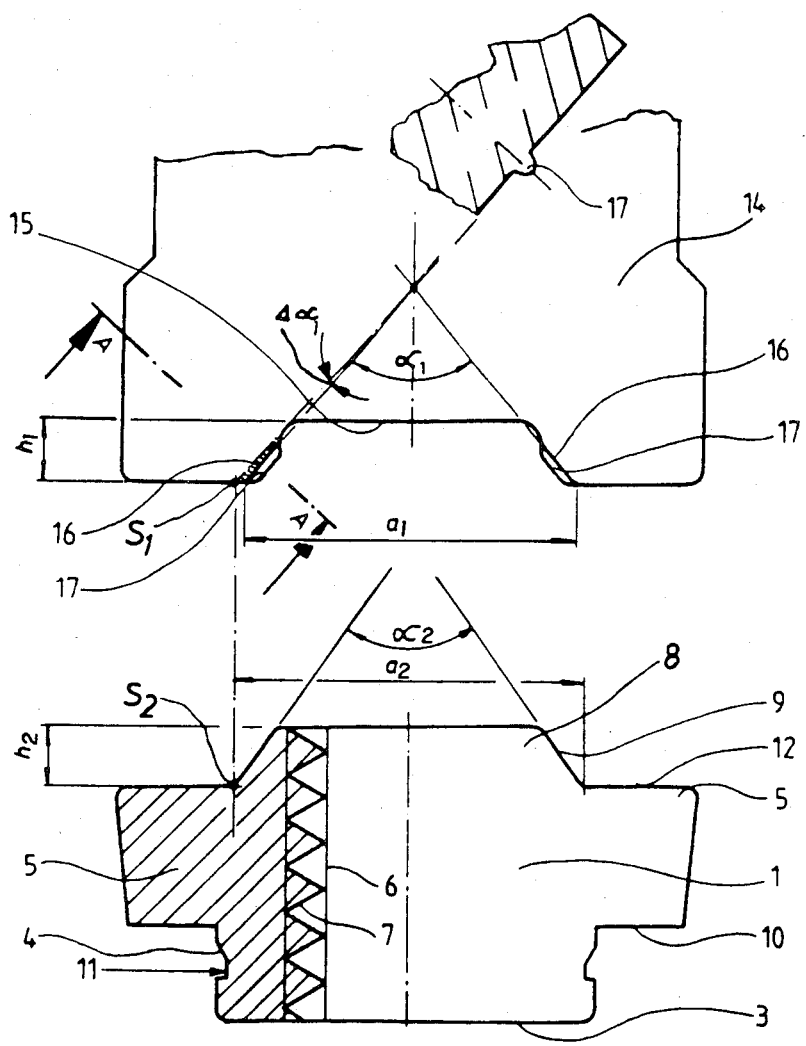
FIG. 7 shows a representation, similar to that of FIG. 1, of a nut and a ram before they touch one another.

This situation emerges particularly clearly from FIG. 7 which, for clarification and for greater understanding of the measures according to the invention, illustrates in detail the state before the fastening of the nut to a plate, with particulars of angles and dimensions and with the initial dimensions of the locking portion of the nut and the associated dimensions of the nut ram. The section A—A in this Figure also shows how, where appropriate, the forming humps appear and how they can be arranged. The hatched representation in the left-hand part of the shaping portion of the nut ram is intended to illustrate that the angle $\alpha_1$ can be widened twice the amount of $\Delta\alpha_1$, if the flow behaviour of the nut material makes this necessary. The sum of the angles obtained from $\alpha_1$ and twice $\Delta\alpha_1$ is limited so that the point of intersection $S_1$ of the angle legs with the ram thrust surface is vertically above the point of intersection $S_2$ of the forming slope 9 with the shoulder surface 12.

The forming humps 17 according to the section A—A are not always necessary to produce the locking properties of the thread, but are required only for materials with good flow properties. The major proportion of the thread-locking properties is achieved as a result of shifting deformation towards the nut axis by means of the appropriate forming slopes 16 of the ram 14.

It is important for the thrust surface of the ram 14 to act on the shoulder surfaces 12 of the nut for the purpose of fastening the nut. As emerges clearly from FIG. 7 and FIG. 1, this is also assisted by the fact that the angle $\alpha_2$ enclosed by the slopes of the locking extension 8 is less than the angle $\alpha_1$ enclosed by the slopes of the recess in the nut ram. Moreover, the depth $h_1$ of the ram recess 15 is greater than the height $h_2$ of the extension 8. The abovementioned angular slopes, intended to be different according to the invention, and dimensions of the locking extension 8 and the ram recess 15 result in the desired dimensional changes in the last two thread pitches of the nut (see also FIG. 5) which guarantee the desired locking effect.

In this initial position, the nut has been fed, by means of known suitable sorting and conveying units matched to the extension 8 according to the invention, to the tool nut ram 14 likewise appropriately matched. It is always guaranteed that the nut 1 is located exactly above the die 13 in the axial direction and that the stamping or riveting portion coincides with the perforation 18 in the die 13. The sheet 2 to be fastened to the nut is located between the nut 1 and the die 13.

As a result of the closing movement of the tool, the nut ram 14 releases the nut from the retention position and drives it vertically onto the surface of the sheet 2. Under the influence of the force $F_{st}$ of the ram 14, a slug 19 is severed from the sheet 2 as a result of the square stamping portion of the nut 1 coinciding with the perforation 18 in the die 13 (see FIG. 2). The square stamping portion corresponds to the rectangular bottom surface 3 and to the adjoining fastening portion 4 of the nut 1. When the nut 1 is driven into the sheet 2, the forming slopes 16 of the ram 14 are in contact via their forming humps 17 with the forming slopes 9 of the extension 8 of the nut 1. This results in a division of the ram force $F_{st}$ into the reaction forces $F_{stN}$ and $F_{stQ}$ indicated according to FIG. 1. During continued fastening, these cause on the extension 8 of the nut 1 a change in the thread dimensions/thread form.

Figure 2:
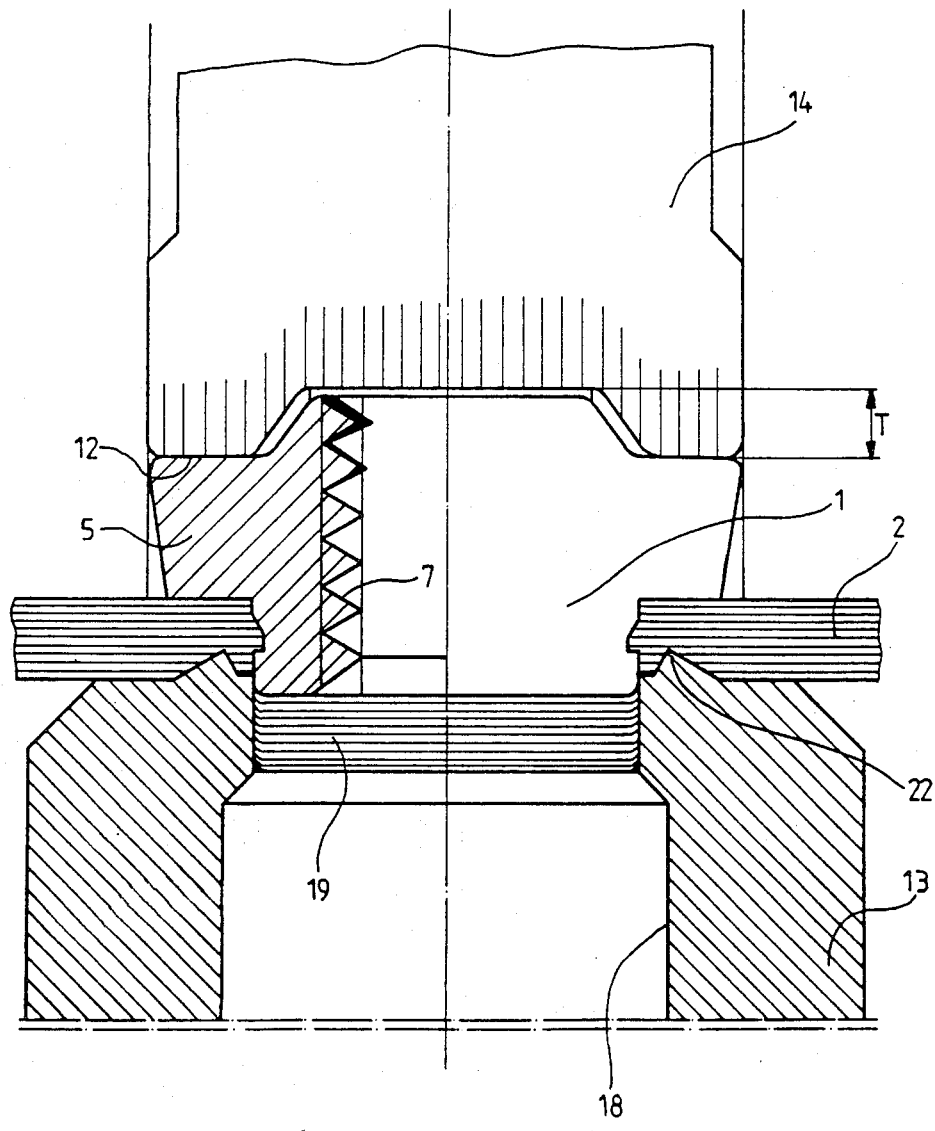
FIG. 2 shows a phase of the fastening operation with a stamping unit at bottom dead centre and with a stamping nut according to the invention worked deeply into the feet.

The final phase of the fastening operation is illustrated in FIG. 2. The nut ram 14 passes through the bottom dead centre and, as a result of the force effect, has worked the nut 1 so deeply into the sheet 2 that the bearing surfaces 10 of the nut shoulders 5 rest positively on the sheet 2. It becomes evident that the nut ram 14 makes contact not only via the forming slopes 16 or forming humps 17, but also via surfaces of the nut 1 which correspond to the upper shoulder surfaces 12. At the same time, die humps 22 have deformed the sheet 2 in such a way that a corresponding volume of the sheet material has penetrated into the grooves 11 of the undercut fastening portion 4 of the stamping nut 1.

Because the nut ram 14 corresponds to the negative contour of the nut 1 on its top side having the extension 8, with the exception of the forming humps 17, parts of the forming slopes 9 of the locking extension 8 can be deformed via the thrust and forming surface of the ram 14, in such a way that the forming humps 17 penetrate into the locking extension 8 of the nut and achieve the desired dimensional change in the top two thread pitches. This deformation is of equal amount in any nut of the same type stamped in the sheet. An extremely high shaping constancy is obtained, and this guarantees an always identical and sufficient thread-locking effect. Particularly in the course of fastening, when the ram 14 passes through the precisely defined bottom dead centre a predeterminable positive connection between the nut 1 and the ram 14 takes place.

The choice of appropriate forming edges and angles prevents the nut ram 14 from catching on the top side of the nut 1.

Figure 3:
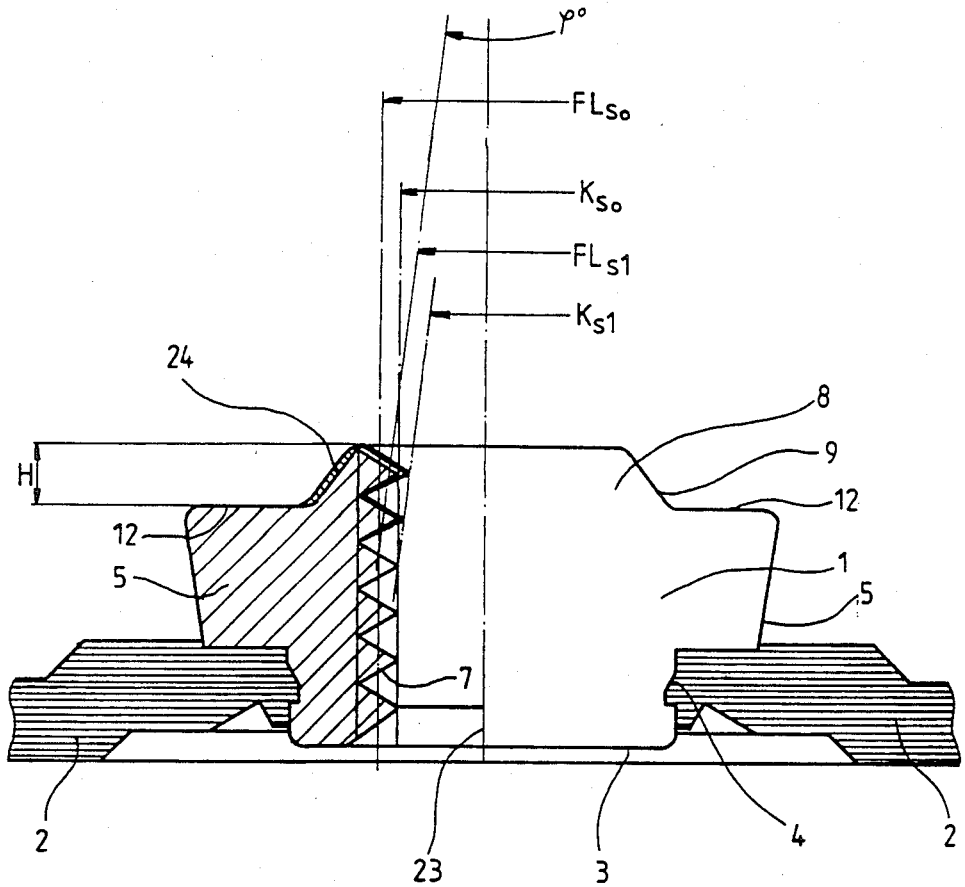
FIG. 3 shows a stamped-in nut in the ready-to-fit metal sheet component made of sheet-metal material.
Figure 6:
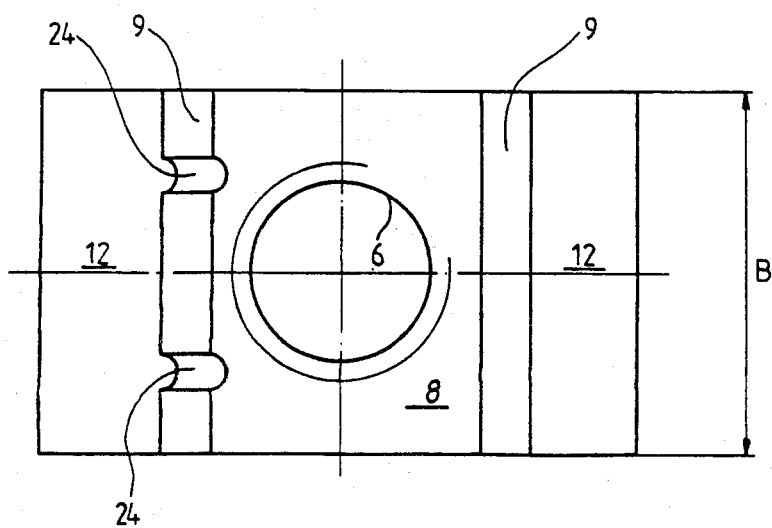
FIG. 6 shows a plan view of a nut according to the invention.

A fastening obtained in this way between the nut 1 and the sheet 2 is illustrated in FIG. 3. The nut 1 has a different thread form in the region of the extension 8. The flank and core diameters given as $Fl_{so}$ and $K_{so}$ correspond to the normal state of the thread 7, whilst the flank and core diameters given as $Fl_{s1}$ and $K_{s1}$ indicate respectively the dimension and deviation of the changed thread form. The flank and core diameters lie on a cone shell segment, the cone angle $\phi^0$ ending acutely in the screw-in direction towards the thread axis 23. The volume of the nut 1 displaced during the dimensional change is identified by 24.

The thread 7 of such a nut 1 is true to gauge in the delivery state, and the locking effect is not achieved until it is connected to the sheet 2. It is therefore possible for the worker to fit components with nuts which are to have thread-locking and to produce others not requiring thread-locking simply by exchanging the nut ram, without using another nut.

Figure 4:
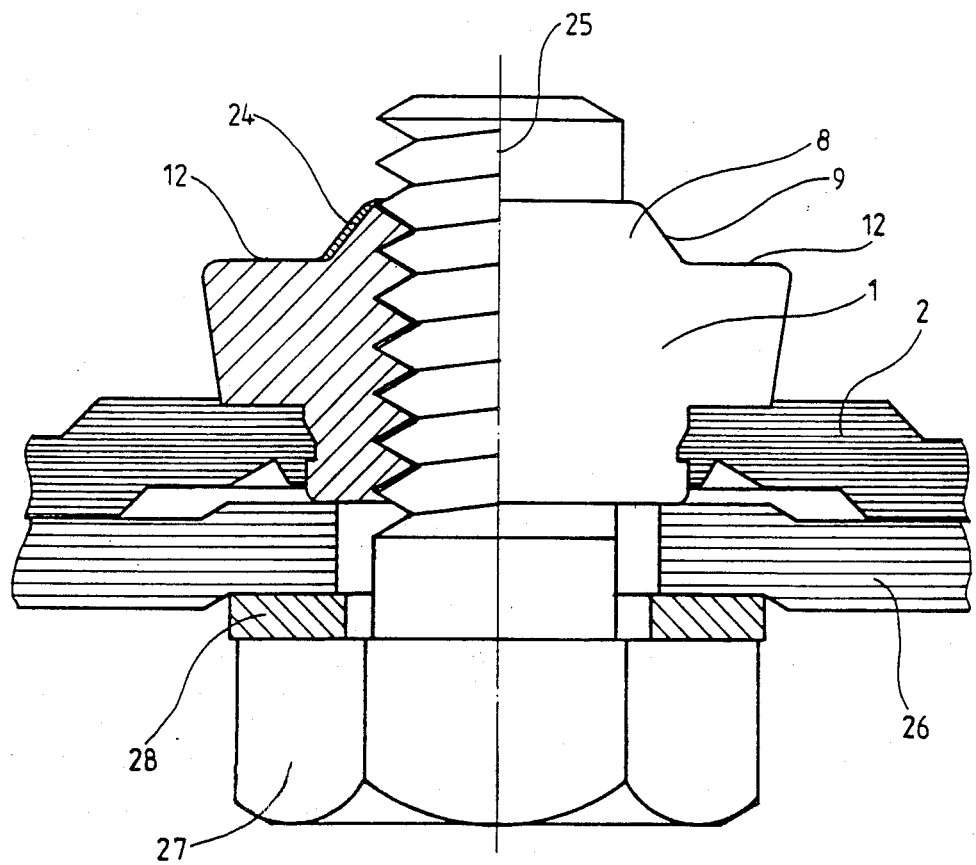
FIG. 4 shows a screw connection made by the use of the article according to FIG. 3 and having a locking effect.
Figure 5:
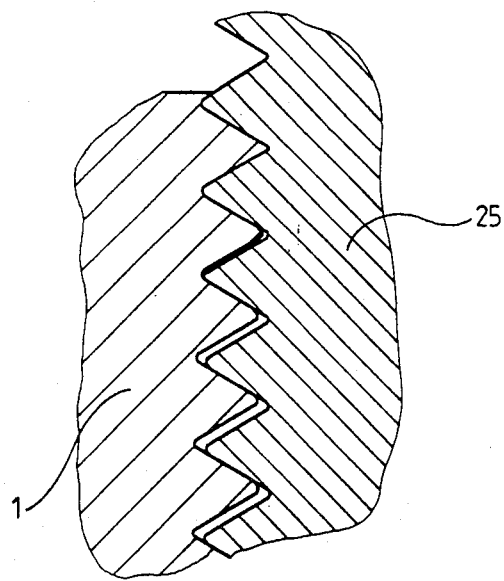
FIG. 5 shows a detail of the article according to FIG. 4.

When the component carrying the nut 1 is subsequently assembled together with one or more parts provided with through-holes for receiving a screw, when a screw 25 penetrates into the nut thread 7, according to FIG. 4, the inwardly inclined thread pitches of the upper thread pitches are driven back again. Very intensive frictional contact thereby occurs between the thread pitches of the screw 25 and those of the nut 1. A high radial pressure is exerted on the thread flanks as a result of the elasticity of the nut and screw material. This radial pressure represents, by means of the specific coefficient of friction $\mu$, an excellent protection against loosening which is further reinforced because the thread run-out on the top side of the stamping nut 1, given here as an exemplary embodiment, has no countersinking. The thread end running out sharply thereby produces a wedging effect which has an additional positive effect against possible loosening. A screw connection made in this way (FIG. 4), for example with a component 26 between a nut 1 connected to the sheet 2 and with a washer 28 placed in front of the screw head 27 of the screw 25, thus guarantees the desired locking effect without further auxiliary measures or additional parts. The detail shown in FIG. 5 illustrates clearly how the screw-thread flanks are gripped on both sides by the nut-thread flanks in the two top thread pitches. This produces a frictional connection which counteracts any loosening tendency. The two-sided contact is achieved because, when the screw is screwed in, the nut-thread region deformed for self-locking purposes is pressed outwards again.

Figure 8:
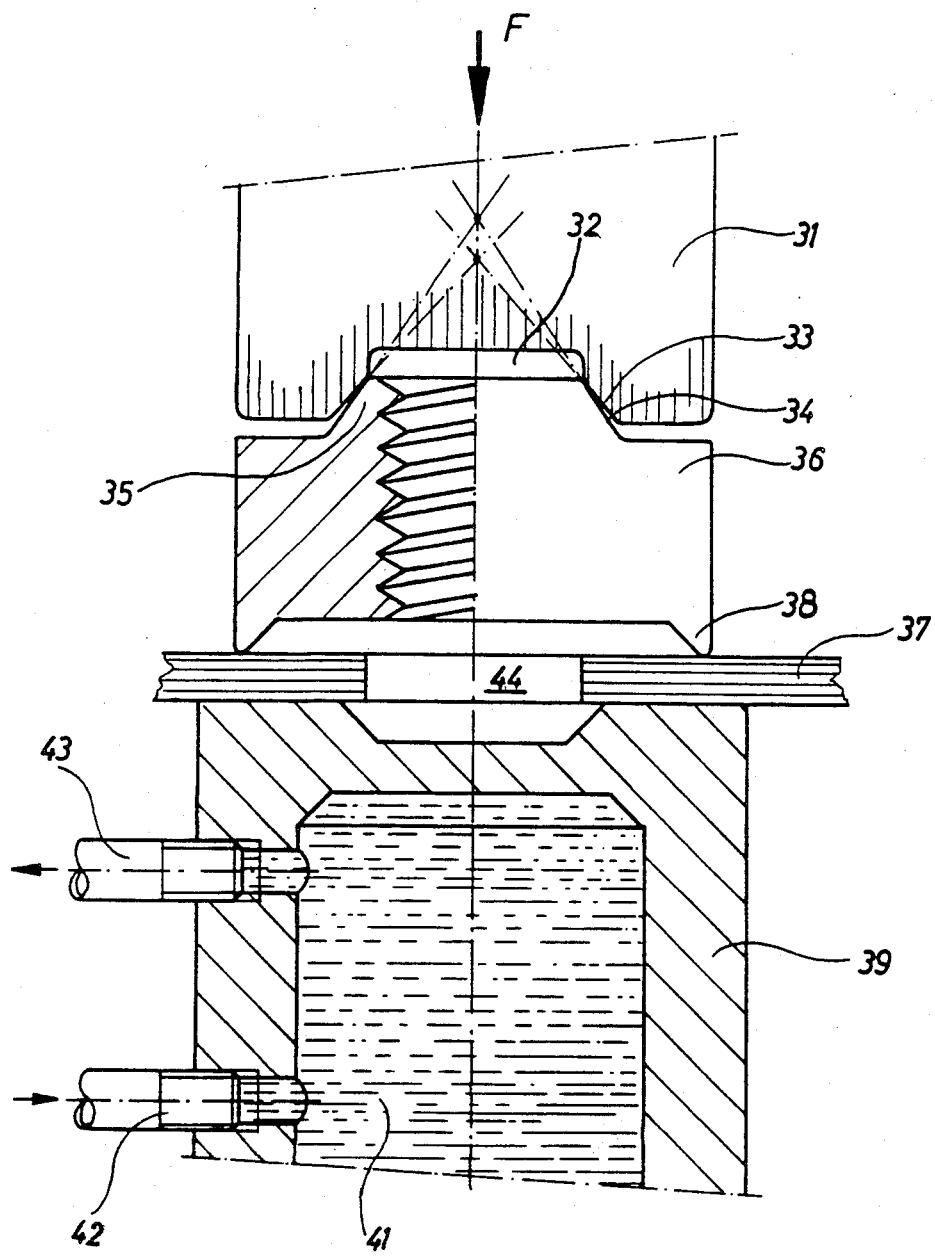
FIG. 8 illustrates the invention by the example of a weld nut.

Finally, FIG. 8 shows a further possible embodiment of the invention, in particular the assembly situation arising when a weld nut is welded to a plate. Here, as in the exemplary embodiment explained previously, a welding electrode 31, functioning virtually in the same way as a ram movable up and down, is likewise provided with a recess 32, the forming slopes 33 of which are in the same relationship to the slopes 34 of an extension 35 of the weld nut 36 and are assigned to these in the same way as in the example described previously. The essential difference here is that the weld nut 36 is provided on its side facing the workpiece 37 to which it is to be fastened, in the present case a sheet-metal part, with welding bosses 38 which are preferably formed as a continuous welding edge.

The opposing tool, that is to say the die, functioning as a fixed anvil, is a second welding electrode 39 which is made hollow, so that it can receive a cooling medium 41 supplied via a line 42 and discharged via a line 43, specifically preferably continuously, to achieve uniform cooling.

In this embodiment, the movable welding electrode 31 performing the ram function does not have to be equipped with forming humps, but only with forming slopes, since at the moment of contact between the nut and the electrode in the region of the forming humps there would occur at the welding electrode such high heating that parts of the nut and also regions of the electrode would melt. When a self-locking weld-nut connection is to be made, the locking portion is deformed inwards towards the thread axis, within the limits which can be predetermined by the slope design, solely as a result of the effect of the heating of the nut which occurs in any case. Of course, where a weld nut is concerned, the workpiece, that is to say the sheet-metal part in the present case, is preperforated coaxially relative to the threaded bore for the passage of the screw (see FIG. 8, reference numeral 44).

Thus, the thread-locking according to the invention takes place as a result of the effect of the so-called tightening torques which arises from the clamping effect attributed to deformed thread pitches. The deformed thread pitches are restored to their original form by the screwed-in screw bolt, a considerably higher coefficient of friction becoming effective between the thread pitches of the nut and screw than during a normal passage. The elasticity behaviour of the nut material at the same time determines the remaining clamping force which generates the abovementioned tightening torque.

As already mentioned, the unwinding torque of the locked screw connection, also called the test torque, will normally be approximately 16% above the tightening torque of a non-locked screw connection. Thus, to make a locked threaded connection according to the invention, a screwing torque one sixth higher than in the case of a non-locked threaded connection must and is produced.

I claim:

1. A method of attaching a self-piercing fastener to a plate-shaped workpiece, said fastener having a pilot portion including a piercing end and a threaded bore extending through said pilot portion and said piercing end, said fastener having an external driving surface opposite said piercing end tapered outwardly longitudinally of said threaded bore, said method comprising:
   (a) locating said fastener adjacent said workpiece with said piercing end facing said workpiece; and
   (b) engaging said fastener driving surface with an internally tapered driving member simultaneously driving said fastener to piece face into said workpiece, piercing said workpiece, and transversely plastically deforming said fastener driving surface, to internally reduce the thread diameter of said thread bore and forming interference fit with a conventional male threaded to be threaded therein.

2. A method attaching a self-piercing fastener to a panel, said fastener having a piercing end, a threaded bore and an external driving surface opposite said piercing end, said driving surface tapered outwardly longitudinally of said threaded bore on at least opposed sides of said bore, said method comprising:
   (a) locating said fastener against said panel and a ram located against said driving surface, said ram having an internal driving face angularly inclined relative to said driving face; and
   (b) driving said ram driving face against said fastener driving surface simultaneously driving said fastener piercing end into said panel, to piece an opening in said panel, and transversely plastically deforming said fastener driving surface, to internally reduce the thread diameter of said thread bore and forming interference fit with a conventional male threaded to be threaded therein.

3. The method of attaching a self-piercing fastener to a panel as defined in claim 2, characterized in that said fastener includes flange portions extending from opposed sides of said fastener, said tapered fastener driving surface extending toward the axis of said bore from said flange portions and said ram having an end surface on opposed sides of said driving face, said method including driving said ram driving face against said nut driving surface, piercing said panel and deforming said nut, as defined, until said ram end surface engages said fastener flange portions, thereby limiting the movement of said ram relative to said fastener.

4. A method of attaching a metal female fastener to a plate-shaped workpiece, said fastener including a body portion having a bearing end portion, a threaded bore extending through said body portion and an extension portion adjacent said bore on at least opposed sides of said bore opposite said bearing end portion, said extension having an external driving surface tapered outwardly along the axis of said bore on opposed sides of said bore, said method comprising:
   locating said fastener against said workpiece with a driving member against said fastener driving surface, said driving member having a plurality of projecting ribs each having an internal driving surface angularly inclined relative to said fastener driving surface; and driving said driving member projecting ribs into said fastener extension portion driving surface on opposed sides of said fastener bore, driving said fastener bearing end portion against said plate-shaped workpiece to pierce said fastener into said workpiece and said driving member ribs simultaneously plastically deforming said fastener extension radially inwardly to deform the threads located within said extension.

5. The method defined in claim 4 wherein said fastener bearing end portion is a substantially flat piercing face, said method including driving said fastener piercing face into said workpiece, piercing an opening in said workpiece, and simultaneously deforming said fastener extension portion.

* * * * *

UNITED STATES PATENT AND TRADEMARK OFFICE
CERTIFICATE OF CORRECTION

PATENT NO. : 4,642,869

DATED : February 17, 1987

INVENTOR(S) : Rudolph R. M. Muller

It is certified that error appears in the above-identified patent and that said Letters Patent is hereby corrected as shown below:

In column 9, cancel lines 7 to 42 and insert the following claims:

1. A method of attaching a self-piercing fastener to a plate-shaped workpiece, said fastener having a pilot portion including a piercing end and a threaded bore extending through said pilot portion and said piercing end, said fastener having an external driving surface opposite said piercing end tapered outwardly longitudinally of said threaded bore, said method comprising:
    (a) locating said fastener adjacent said workpiece with said piercing end facing said workpiece; and
    (b) engaging said fastener driving surface with an internally tapered driving member simultaneously driving said fastener piercing face into said workpiece, to pierce said workpiece, and transversely plastically deforming said fastener driving surface, to internally reduce the thread diameter of said thread bore and forming interference fit with a conventional male threaded fastener to be threaded therein.

2. A method of attaching a self-piercing fastener to a panel, said fastener having a piercing end, a threaded bore and an external driving surface opposite said piercing end, said driving surface tapered outwardly longitudinally of said threaded bore on at least opposed sides of said bore, said method comprising:

UNITED STATES PATENT AND TRADEMARK OFFICE
CERTIFICATE OF CORRECTION

PATENT NO. : 4,642,869            Page 2 of 2

DATED : February 17, 1987

INVENTOR(S) : Rudolph R. M. Muller

It is certified that error appears in the above-identified patent and that said Letters Patent is hereby corrected as shown below:

(a) locating said fastener against said panel and a ram located against said driving surface, said ram having an internal driving face angularly inclined relative to said driving face; and (b) driving said ram driving face against said fastener driving surface simultaneously driving said fastener piercing end into said panel, to pierce an opening in said panel, and transversely plastically deforming said fastener driving surface, to internally reduce the thread diameter of said thread bore and forming interference fit with a conventional male threaded fastener to be threaded therein.

Signed and Sealed this

Eighth Day of December, 1987

*Attest:*

DONALD J. QUIGG

*Attesting Officer*      *Commissioner of Patents and Trademarks*